United States Patent [19]

Khudenko

[11] Patent Number: 4,472,358
[45] Date of Patent: Sep. 18, 1984

[54] PACKING FOR FLUIDIZED BED REACTORS

[75] Inventor: Boris M. Khudenko, Atlanta, Ga.

[73] Assignee: Georgia Tech Research Institute, Atlanta, Ga.

[21] Appl. No.: 382,615

[22] Filed: May 27, 1982

[51] Int. Cl.³ .............................................. B01J 8/04
[52] U.S. Cl. ..................................... 422/141; 55/90; 55/233; 210/150; 261/94; 261/108; 261/DIG. 72; 422/310
[58] Field of Search ...................... 422/141, 142, 310; 261/94–98, 108, 113, 111, DIG. 72; 210/150, 151; 55/90, 233

[56] References Cited

U.S. PATENT DOCUMENTS

| | | | |
|---|---|---|---|
| 2,321,719 | 6/1943 | West | 261/113 X |
| 2,431,455 | 11/1947 | Blanding | 261/94 X |
| 2,911,290 | 11/1959 | Jonke et al. | 422/142 |
| 2,938,773 | 5/1960 | Kooistra | 261/108 X |
| 3,233,981 | 2/1966 | Scott | 261/DIG. 72 |
| 3,489,208 | 1/1970 | Manteufel | 261/DIG. 72 |
| 3,643,931 | 2/1972 | Henning et al. | 261/111 |
| 4,269,795 | 5/1981 | Bosman | 261/111 |
| 4,295,967 | 10/1981 | Kurima et al. | 422/142 X |

Primary Examiner—Richard L. Chiesa

[57] ABSTRACT

Packing for fluidized bed reactors, is improved by providing alternately inclined baffles connected directly to each other or by means for connecting the said baffles into grids located in one or several levels, the said baffles forming expanding and contracting cells in the direction of the flow. The size, spacing in grids and the angle of attack of these baffles and spacing of grids are the same throughout the reactor volume when uniform distributions of the fluidizing agent and the fluidized medium are required. Alternatively, a device of this type is improved by providing variable sizes, spacing in grids, and angle of attack of these baffles and spacing of grids when specified nonuniform distributions of the flow of the fluidizing agent and the concentrations of the fluidized media are desired for particular applications.

3 Claims, 16 Drawing Figures

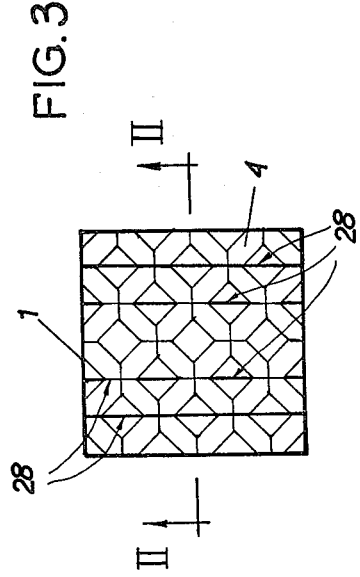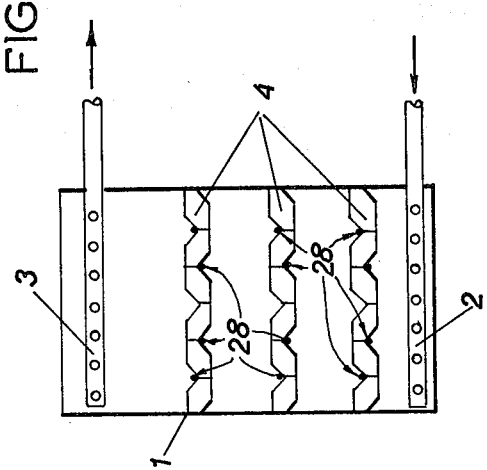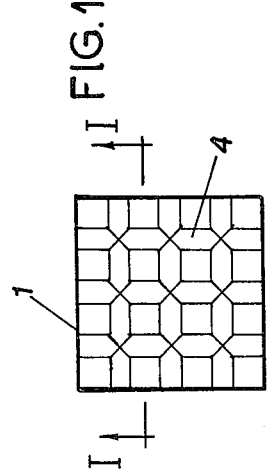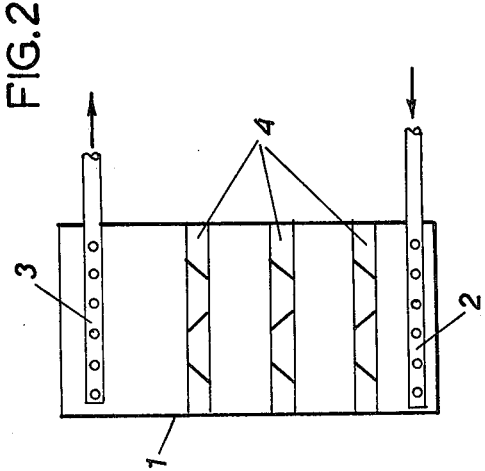

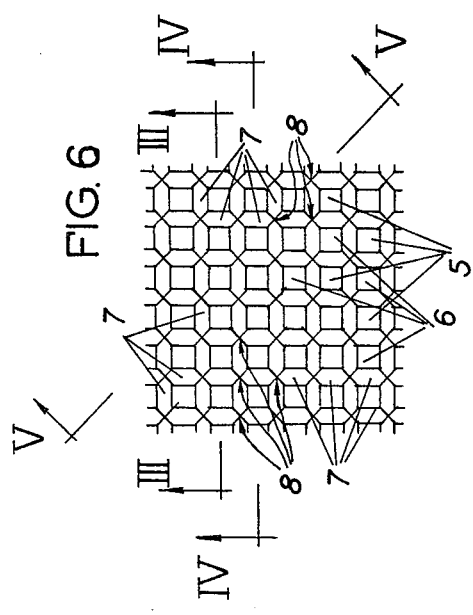
FIG. 6
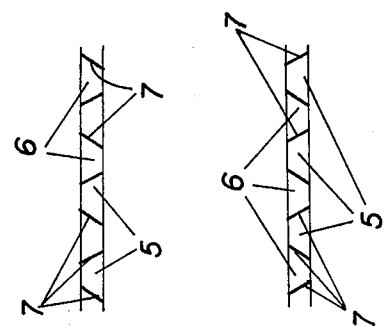
FIG. 7
FIG. 8
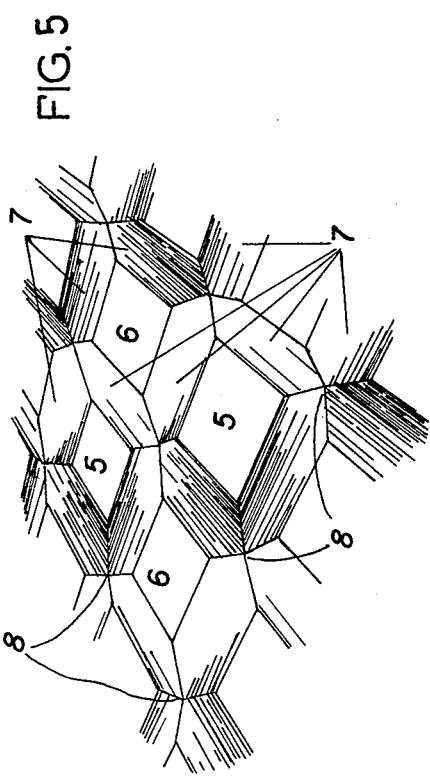
FIG. 5
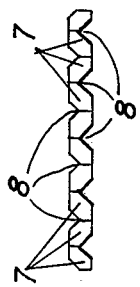
FIG. 9

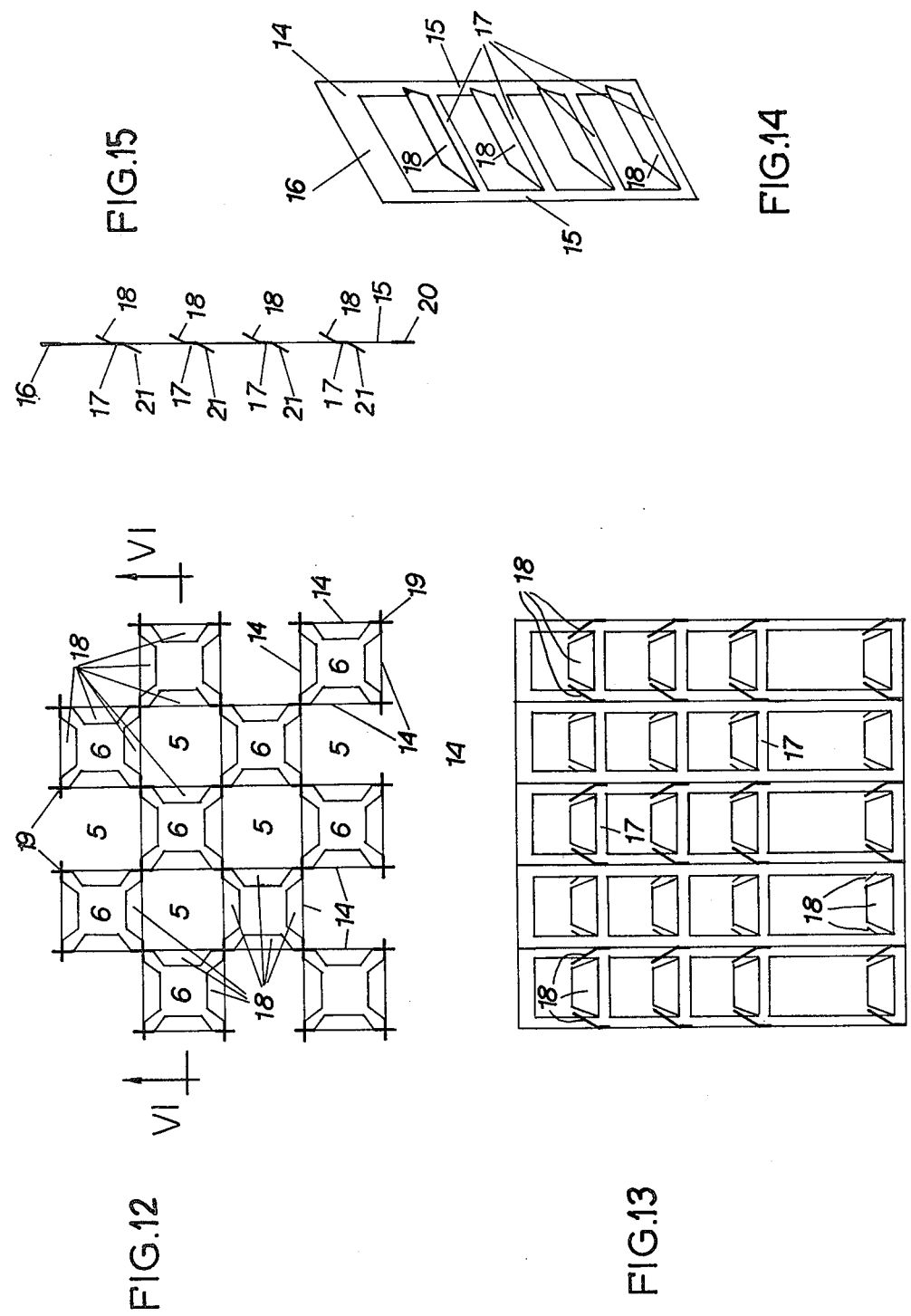

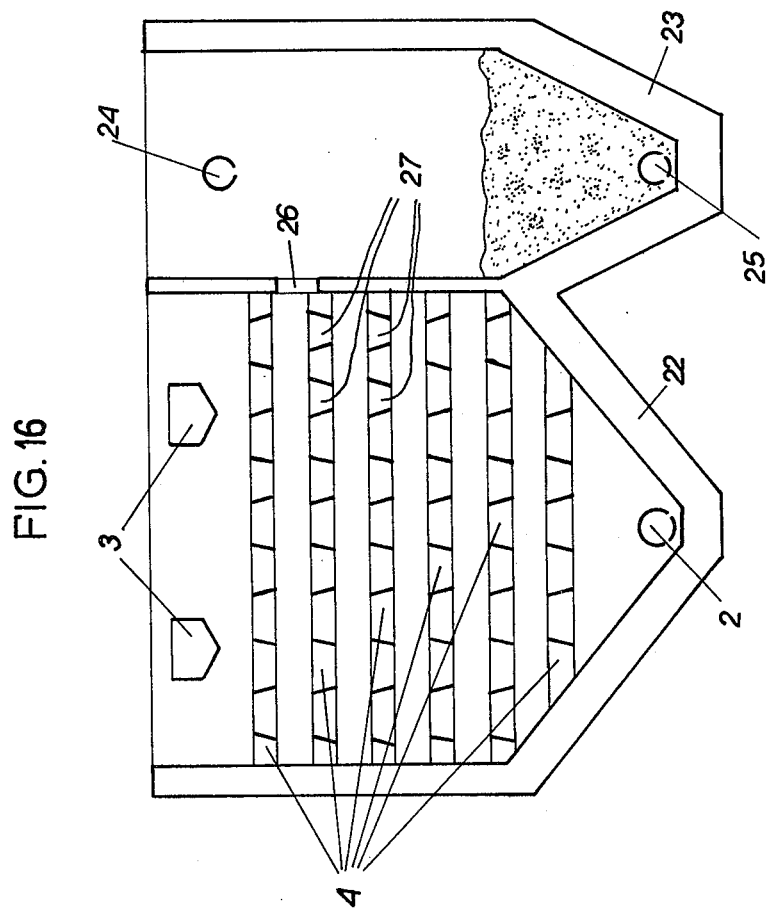

PACKING FOR FLUIDIZED BED REACTORS

FIELD OF INVENTION

This invention relates to devices for supressing the boiling and channeling in fluidized beds used for phase separation, mass transfer, and chemical or biological processes in water and wastewater treatment, food, chemical and other industries.

PRIOR ART

For many processes, for example suspended sludge blanket clarification, absorption, ion exchange, biological processes, fluidized bed reactors demonstrate better performance than other reactor types and provide significant capital and operational savings and a greater convenience of operation. The concrete technological advantages are process specific.

A fluidized bed reactor consists of the body of the reactor with one or another type of distribution system for liquid or gas fluidizing agent (sometimes liquid and gas are used simultaneously) located at the bottom of the reactor. The reactor is either charged with a certain quantity of solid particles, which are called the bed, or the bed is formed by the particles (solid or liquid) coming into the reactor with the fluidizing agent, or the bed is formed as a result of physical (condensation of vapors), chemical and physico-chemical (coagulation-flocculation, crystallization) or biological (growth of microorganisms) processes. In the upflow of the fluidizing agent the bed particles become a fluidized material. One or another type of collection system is located at the top of the reactor.

The theories, applications, advantages and disadvantages of fluidized bed reactors and various elements of these reactors are discussed in the following sources:

"Méchanique Des Suspensions" by A. Fortier, Masson et C-ie Editeurs 120, Boulevard Saint-Germain, Paris-VIe, 1967; "Proceedings of the International Symposium on Fluidization" June 6-9, 1967, A. A. H. Drinkenburg, Editor, Netherland University Press, Amsterdam, 1967; "Fluidization", Davidson, J. F., Harrison, D., Editors, Academic Press, London and N.Y., 1971; "Mechanics of Heterogeneous Media" by Nigmatullin, R. I., Publishing House "Nauka" (Sciences), Moscow, 1978; and articles: Anderson, T. B., Jackson, R., "A Fluid Mechanical Description of Fluidized Beds", I & EC Fundamentals, Vol. 5, No. 4, 1967, Vol. 7, No. 1, 1968, Vo. 8, No. 1, 1969; Medlin, J., Wong, H., Jackson, R., "Fluid Mechanical Description of Fluidized Beds. Convective Instabilities in Bounded Beds", Ind. Eng. Chem. Fundam. Vol. 13, No. 3, 1974; El-Kaissy, M. M., Homsy, G. M., "Instability Waves and the Origin of Bubbles in Fluidized Beds", Int. J. Multiphase Flow, Vol. 2, 1976, Vol 6, 1980; Latif, B. A. J., Rirchardson, J. F., "Circulation Patterns and Velocity Distributions for Particles in Fluidized Bed", Chemical Engineering Science, Vol. 27, No. 11-C, 1977; Vanecek, V., Hummel, R. L., "Structure of Liquid Fluidized Beds with Small Density Difference Between the solids and the Liquid", I. Chem. E. Symposium Series, No. 30, 1968; Fan, L. T., Ho, T., Hiraoka, S., Walawender, W. P., "Pressure Fluctuations in Fluidized Bed", AIChE Journal, Vol. 27, No. 3, 1981; Pigford, R. L., Baron, T., "Hydrodynamic Stability of a Fluidized Bed", I & EC Fundamentals, Vol. 4, No. 1, 1965; Happel, T., Brenner, H., "Low Reynolds Number Hydrodynamics with Special Applications to Particulate Media", Prentice-Hall, 1965; "Fluidization Technology", edited by Keairns, D. L., McGraw-Hill International Book Co., 1976.

In accordance with these sources one of the major disadvantages of fluidized bed reactors is the hydrodynamic instability which is manifested through the channeling of the bed at low velocities of the fluidizing agent and the boiling of the bed at high velocities of flow. Both channeling and boiling cause shortcircuting of the fluidizing agent and consequent lowering of the retention time of fluidizing agent in the reactor. In case of boiling, intensive mixing of the fluidized material occurs. In case of channeling, only partial fluidization of the bed occurs. In both cases, the rates and efficiencies of physical, chemical, physico-chemical, and biological processes become lower.

Channeling and boiling phenomena are discussed in the literature sources cited previously in this section. Based on these discussions the mechanisms of channeling and boiling can be presented as follows.

Channeling of the bed occurs at lower velocities of flow of the fluidizing agent and, consequently, at lower expansions of the bed. At a certain velocity of flow the initially compact bed becomes loosened, although, the particles of the bed remain in contact with each other. The further increase of the velocity of the flow over the velocity which produces loosening of the bed causes the particles to separate from each other at the locations where cohesion or interlocking among the particles is weaker. Such separation starts at the bottom of the bed and progresses upwardly as a fast rupture of the bed. Along the ruptures in the bed channels are formed, while in the rest of the bed the particles are not fluidized. The formation of channels is primarily associated with the properties of the particles forming the bed. The channeling occurs more frequently in cohesive beds formed by flocculent particles, and in beds formed by smaller particles which tend to interlock more strongly than larger particles. Distribution devices with a nonuniform distribution of the fluidizing agent may aggravate the channeling problem. However, even the ideally uniform distribution of the fluidizing agent cannot prevent the channeling of the bed.

The boiling occurs at greater velocities of flow of the fluidizing agent and consequently greater expansions of the bed. The boiling type of instability of a fluidized bed is associated with the structure of such a bed. Ideally a fluidized bed is a system of alternating horizontal layers of greater and lower concentration of fluidized material. The bottom layer in the bed is always more diluted (less concentrated) than the rest of the bed due to the continuous influx of the fluidizing agent. The thickness (the height) of this layer fluctuates with time. The diluted (less concentrated) layers are "emitted" from the bottom layer and propagate upwardly in a wave-like motion. The fluidized bed exhibits the properties of liquids. Thus, layers of lesser and higher concentration of fluidized material can be considered at layers of liquid, the layers with the greater concentration of the fluidized material being denser than the layers with the lower content of fluidized particles. The system which consists of lighter liquid layers overlayed by the denser layers is a classical example of hydrodynamically unstable system. These layers tend to flip over under the action of a small disturbance. When such a "flip-over" occurs the distribution of velocities of the fluidizing agent across the plan area of the bed becomes nonuniform, the velocity being greater at the locations of the initial upward slips of the lighter layer. At these locations the amount of the fluidized material along the vertical pathways becomes lower. This causes lower hydraulic resistances along these pathways, and therefore increased velocities of flow. Consequently, in the rest of the bed, the velocities of flow of the fluidizing agent decrease. Such changes in the velocities cause the fluidized material to become more diluted over the areas of greater velocities of liquid flow and to become more concentrated at the locations of the reduced velocities of liquid flow. The redistribution of the velocities of the flow of the fluidizing agent and the concentrations of the fluidized material makes the boiling a self-sustaining process. Distribution devices with a nonuniform distribution of the fluidizing agent may aggravate the boiling problem. However, even an ideally uniform distribution of the fluidizing agent cannot prevent the boiling of the bed.

The following conclusions can be made from the preceeding two paragraphs: Both, channeling and boiling are induced by small disturbances and due to nonuniform spacial distribution of the properties of the bed. Once induced, channeling and boiling become self-sustaining and perpetuate even after the removal of the source of small disturbance. Distribution devices with a nonuniform distribution of the fluidizing agent may aggravate the channeling and boiling problems. However, ideally uniform distribution of the fluidizing agent cannot prevent the boiling of the bed. Therefore, the means intended to control the channeling and the boiling of the fluidized bed should be located within the bed itself.

Various techniques which may control the distributions of the velocities of flows of the fluidizing agent and concentrations of the fluidized material in the bed have been discussed in several literature sources. Reviews on this subject are presented by D. Harrison and J. R. Grace in the book "Fluidization", Edited by Harrison and Davidson, Academic Press, London and N.Y. 1971, and by F. J. Zuiderweg in "The Proceedings of the International Symposium on Fluidization" edited by Drinkenburg, Netherland University Press, Amsterdam, 1967. The following devices are described: (1) bunches of parallel horizontal pipes and rods, (2) bunches of vertical pipes and rods, (3) fixed stone or ball packing, (4) fixed ring packing, e.g., Raschig or other ring types, (5) parallel vertical baffles, (6) parallel inclined baffles. It has been shown that these devices can lessen the boiling and/or channeling to some degree. However, they exhibit the following disadvantages: (1) vertical and horizontal pipes and rods, stone and ball, and, to a lesser degree, rings, occupy substantial space (65% for stone) and reduce the effective volume of the reactor; (2) free spaces in the stone, and ring media are not uniform and stagnation zones occur in the reactor with such packing types, (3) bunches of horizontal pipes and rods, and parallel vertical or parallel inclined baffles do not produce the bidirectional control action in the bed needed to prevent boiling and channeling, (4) bunches of vertical rods and parallel vertical baffles promote channeling of the bed, (5) parallel inclined baffles promote boiling of the bed through inducing asymmetrical flows in the bed, (6) neither of the present type packings is intended to produce a controlled nonuniform distributions of the flows of the fluidizing agent, and the concentrations of the fluidized material. Such nonuniform distributions can be desirable for specific applications such as fluidization of multiple media, or single media distributed nonuniformly in the horizontal section of the reactor.

OBJECTS

Accordingly it is the primary aim of the present invention to provide a packing for fluidized bed reactors which is capable of uniform bidirectional control of channeling and boiling of fluidized beds.

It is another object of the present invention to provide a packing which occupies little volume in the reactor.

It is further an object of the present invention to provide a packing free from dead zones.

It is further an object of the present invention to provide a packing which does not promote channeling and does not induce the boiling of the fluidized bed.

It is a further object of the present invention to provide a packing capable of producing controlled nonuniform distributions of the flows of the fluidizing agent and concentrations of the fluidized material in the bed which can be desirable for specific applications such as fluidization of multiple media, distributed along the height of the reactor, or a single medium distributed nonuniformly either along the height or across the reactor, or in both directions.

It is also an object of the present invention to provide a packing for fluidized beds which is simple to produce and manufacture.

DESCRIPTION OF THE DRAWINGS

FIG. 1 is a top view of a fluidized bed reactor with the preferred packing type.

FIG. 2 is a view of the portion indicated by section lines I—I in FIG. 1.

FIG. 3 is a top view of a fluidized bed reactor with the preferred packing type being turned at 45° angle as compared with FIG. 1.

FIG. 4 is a top view of the portion indicated by section lines II—II in FIG. 3.

FIG. 5 is a persective view of a section of the preferred packing.

FIG. 6 is a top view of a single layer of the preferred packing.

FIG. 7 is a view of the portion indicated by section lines III—III in FIG. 6.

FIG. 8 is a view of the portion indicated by section lines IV—IV in FIG. 6.

FIG. 9 is a view of the portion indicated by section lines V—V in FIG. 6.

FIG. 12 is the top view of another alternative configuration of the preferred packing type.

FIG. 13 is a view of the portion indicated by section lines VI—VI in FIG. 12.

FIG. 14 is a perspective view of a single element from which the preferred packing type exemplified in FIGS. 13 and 14 can be assembled.

FIG. 15 is a vertical section of the alternative configuration of a single element exemplified in FIG. 14.

FIG. 16 is a vertical section of the suspended sludge blanket reactor which utilizes the preferred packing type capable of producing the desirable nonuniform distributions of the flows of the fluidizing agent and the concentrations of the fluidized material.

DESCRIPTION OF THE PREFERRED EMBODIMENT

Figure 10:
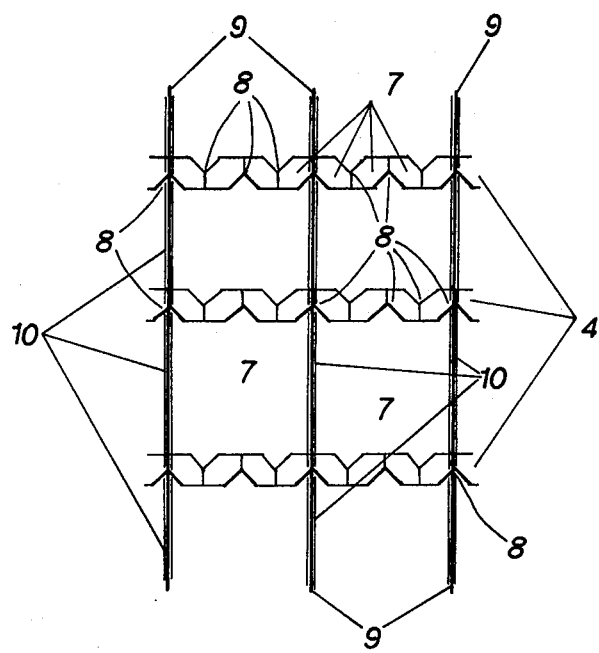
FIG. 10 is a vertical section of a portion of a stack of several single layers of the preferred packing and the means for spacing and securing these layers in the reactor.

Referring now to FIGS. 1, 2, 3 and 4, there is shown a fluidized bed reactor comprising the body of the reactor 1, the system for distribution of the fluidizing agent 2, the system for collection of the effluent 3, and grids of packing 4, each grid forming a layer of the packing. The strings or rods 28 passing over and under the grids are the means for securing the grids in the reactor.

Referring now to FIGS. 5, 6, 7, 8, 9, there is shown a single grid of the preferred packing which consists of the contracting 5 and expanding 6 cells in the direction of the flow of the fluidizing agent, the said cells being formed by inclined hexagonal baffles 7 connected with each other at the corners of the said cells 5 and 6 and forming the saddle shape surface with the nodal point 8 at these corners.

Referring now to FIGS. 2 and 4, the alternative arrangement of the grids 4 when the baffles located on the same vertical are oppositely inclined. This can be achieved by placing every other grid upside down.

Referring now to FIG. 10 there is shown a section of portion of a stack of the grids 4, with the holes made at some of the saddle points 8 and the vertical rods or strings 9 passing through these holes and the sliding spacers 10 put on the said rods or strings, the lengths of the said spacers being specified for a particular application, and the cross-sectional size being greater than the size of the holes at the saddle points. The vertical rods or strings 9 and sliding spacers 10 are an alternative means for securing the grids of packing in the reactors.

Figure 11:
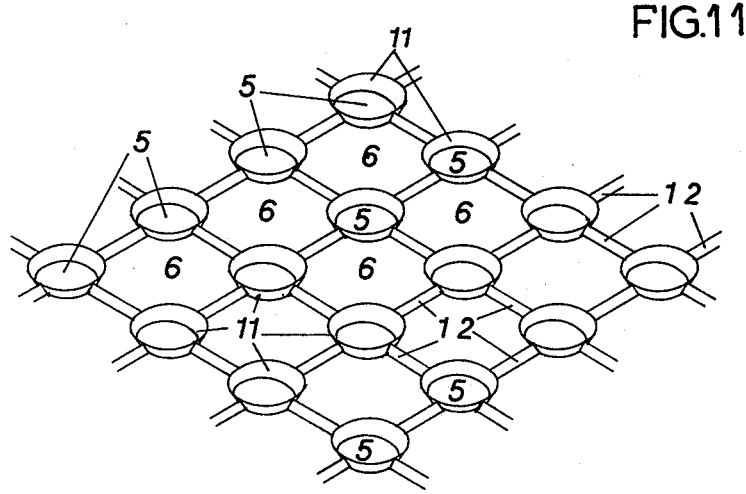
FIG. 11 is a perspective view of the alternative configuration of the preferred packing type.

Referring now to FIG. 11 there is shown an alternative configuration of the single grid of the preferred packing type comprising expanding cells 5 formed by conical baffles 11 and contracting cells 6 formed by the said conical baffles 11 and the vertical baffles 21 connecting the conical baffles into a grid 4. The length of the baffles 12 can vary from zero to a specified value. The grid exemplified in FIG. 12 can also be used in the upside down position. In such a case the expanding cells are formed by cones 11 and the contracting cells are formed by the cones 11 and the vertical baffles 12.

Referring now to FIGS. 12, 13, and 14 there is shown another alternative configuration of the preferred packing type comprizing vertical frames 14 which are single elements from which the alternative packing type can be assembled. This frame can be stamped out of a sheet material. It consists of vertical strips 15, a horizontal connecting band 16 at the top of the frame, horizontal strips 17 connecting vertical strips 15, and inclined baffles 18 shaped as trapezoids. The frame 14 can be considered as a louvered frame with fins composited from elements 17 and 18. Four louvered frames are connected along the lengths of the vertical strips 15 into a square box 19 thus forming a stack of contracting cells 6. The boxes 19 can be assembled in a checkered position and connected along the corners into a tridimensional structure. The spaces amoung four boxes 19 form the stack of expanding cells 5. The entire tridimensional frame formed of elements 14 incorporated into the boxes 19 represents the stack of grids with the checkered expanding and contracting cells. This tridimensional frame can also be used in the upside down position.

Referring now to FIG. 15 there is shown a modification 20 of the element 14 as exemplified in FIG. 14. This modification incorporates additional inclined trapezoidal baffles 21 attached to the horizontal strips 17 at their lower side and bent in the direction opposite to the plates 18. The elements 20 can be connected into a tridimensional structure similar to that formed by elements 14 but with equal sizes of expanding and contracting cells.

Referring now to FIG. 16, there is shown the suspended sludge blanket reactor 22 combined with the sludge separator 23. The reactor 22 is equipped with the distribution device for water or wastewater 2, the collection devices for treated water 3 located at the top of the reactor 22 and another collection device 24 located at the top of the sludge separator 23. A sludge discharge system 25 is located at the bottom of the sludge separator 23. The reactor 22 and the sludge separator 23 are hydraulically connected by means of the opening(s) 26 located in the common wall between the reactor 22 and the sludge separator 23 at an elevation slightly lower than the top level of the suspended sludge blanket. The reactor is equipped with the packing 4 located throughout the volume occupied by the suspended sludge blanket but the zone adjacent to the opening(s) 26, where packing type 27 is placed. The packing 27 differs from the packing 4 either by a closer spacing of baffles, or by a greater angle of attack, or by other parameters producing greater resistance to the flow. If needed, the reactor 23 can be covered and equipped with the means for collecting gases produced in the reactor. The reactor 22 can be charged with the solid media, or the solid media can be formed in the reactor due to chemical or biological processes, or both the charged and the formed media can be present.

OPERATION OF THE DEVICE

Referring now to FIGS. 1, 2, 3, 4, 5, 6, 7, 8, 9 and 10 and the preferred embodiment described above, the device would be operated as follows:

The fluidizing agent fed into the reactor 1 through the distribution device 2 would fluidize the bed media either charged into the reactor or formed in the reactor. While passing across the fluidized media the fluidizing agent would be treated. Either separation of phases, or chemical, physico-chemical, biological, or other processes would occur. The treated fluidizing agent would be collected by the collection device 3 and removed from the reactor.

While passing through the grids 4 of the proposed packing exemplified in FIGS. 1, 2, 3, 4, 5, 6, 7, 8, 9, and 10, the fluidizing agent would induce circulations of the fluidized material and the fluidizing agent, the said circulations being localized around the inclined baffles. In the contracting cells 5, the flow of the fluidizing agent would accelerate along the vertical pathway and the velocity of flow will become greater than the approach velocity at the bottom of the grid 4. This would cause the fluidized material to be transported upwardly across and out of the grid and, consequently, the concentration of fluidized material in the contracting cell would become lower than that at the approach to the grid 4. In the expanding cells 6, the flow of the fluidizing agent would decelerate and cause the fluidized material to be precipitated. The accumulation of the fluidized material in expanding cells 6 and the depletion of the fluidized material from the contracting cells 5 would cause a greater hydraulic pressure loss across the expanding cells than the loss across the contracting cells. This would result in a greater pressure under the expanding cells 6 than the pressure under the contracting cells 5, and in a greater pressure over the contracting cells 5 than over the expanding cells 6. These pressure differentials would cause the fluidizing material to flow in horizontal directions, from the expanding cells 6 toward the contracting cells 5 under the lower tips of the inclined baffles, and from the contracting cells 5 towards the expanding cells 6 over the upper tips of the inclined baffles. These horizontal flows and the accelerated flow in the contracting cells and the decelerated flow in the expanding cells would constitute the circulation flows around the inclined baffles. The checkered arrangement of the contracting 5 and expanding 6 cells would produce a tridimensional circulation within each grid. These circulations would be comprised of the interacting toroidal flows. In the absence of disturbances the intensity of all circulation would be equal across each of the grids 4. It was observed in the experimental testing of the preferred embodiment that the intensity of circulation increases when the velocity of the fluidizing agent increases. When a disturbance occurs, such as a localized faster flow of fluidizing agent induced by the distribution device or due to a change in the temperature of the fluidizing agent fed into the reactor, the circulations in the area of the grids 4 where the flow is greater would become more intense. This would induce a greater horizontal flows under the grids 4 towards the area of the increased flows bringing more fluidized material to this area, and increasing the hydraulic resistance at this location. This would also induce greater horizontal flows over the grids 4 from the area of the increased flows, therefore, reducing the velocities of flow approaching the higher located grids. The changes in the resistances and pressures across the reactor would cause the disturbance to be suppressed. The checkered arrangement of the contracting and expanding cells would provide the bidirectional control of the disturbances in the horizontal cross-section of the reactor.

The circulation flows would break up the system of lighter and denser layers and the vertical channels in the fluidized bed and, therefore, eliminate the reasons for the boiling and channeling which are associated with the structure of the fluidized bed and the physicochemical properties of particles.

The packing of the proposed configuration would suppress channeling and boiling induced by disturbances of any origin, e.g., imperfect distribution device 2, or fluctuations in the fluidizing agent (for example, fast increase in temperature), or due to the processes occurring in the bed (for example, formation of gases in the reactor volume), or due to inherited instability of the bed itself and random small fluctuations in the bed.

Referring now to FIG. 11, and the preferred embodiment described above, the modification of the proposed grid consisting of conical baffles 11 connected by vertical baffles 12 would be operated the same way as the packing described in the preceeding paragraph of this section.

Referring now to FIGS. 12, 13, 14, and 15, and the preferred embodiment described above, the modification of the proposed grid formed by the louvered frames 14 with the inclined fins 18 or inclined fins 18 and 21, the said frames being assembled into a tridimensional frame 19, would be operated the same way as the packing described in the preceeding paragraphs of this section.

For different applications the sizes of cells 5 and 6, the spacing of inclined baffles 7, or 11, or 18 and 21, their height, and the angle of attack (inclination) of the inclined baffles, and the vertical spacing between grids 4 would vary. For specific applications different grids and various spacing between grids can be used in the same reactor. For example, FIG. 16 illustrates the suspended sludge blanket clarifier which utilizes the proposed packing. The clarifier is operated as follows: The liquid carrying suspended solids and added with reagents, for example, coagulants, would be distributed in the suspended sludge blanket reactor 22 by the means of the distribution device 2. In the body of the reactor coagulation and formation of larger solids particles than that entering the reactor would occur. These particles would be fluidized by the incoming flow of liquid. The subsequent portions of of the liquid fed into the reactor would be treated in contact with the previously formed particles. The treated water would be collected by the collection devices 3 located at the top of the reactor 23 and devices 24 located at the top of the sludge separator 23. The liquid flow from the reactor 22 to the sludge separator 23 forced by the collecting of liquid by the collection device 24 would carry the sludge accumulated in the reactor across the opening(s) 26 into the sludge separator where the sludge precipitates. Continuously or periodically, this sludge would be removed from the sludge separator by the means of the sludge discharge system 25. The reactor 22 is packed with the proposed packing consisting of the grids 4 which are intended to suppress the boiling and channeling and grids 27 which are intended to preconcentrate the sludge prior to its transfer to the sludge separator. The spaces between inclined baffles in the grids 27 are smaller than in grids 4. This would produce a higher hydraulic resistance across the location of the grids 27 and would cause solids transport towards the location of these grids and liquid transport from the grids. The prethickened sludge would require a lower flow to be directed into the sludge separator. Therefore, the volume of the sludge separator would be reduced.

The use of grids of various sizes and spacing will also be beneficial in the reactors with multiple fluidized materials, such as sand, antracite, active carbon, etc., because it will permit the simultaneous fluidization and classification of different media.

Principal elements of the device have been tested. The data on testing is presented in the report "Hydrodynamics of Fluidized Bed Reactors for Wastewater Treatment" by B. M. Khudenko and R. M. Palazzolo.

While the above description contains many specificities, these should not be construed as limitations on the scope of the invention, but rather as an exemplification of one preferred embodiment thereof. Many other variations are possible. For example, the proposed packing consisting of expanding and contracting cells can be formed by curvilinear baffles, the cells can be staggered in vertical directions, various means for connecting and supporting the baffles can be used; the proposed packing can be used for other applications not mentioned in this text; mixing, elimination of mist from gases, thickening of fluffy sludges, heat transfer, etc.

What is claimed is:

1. A packing for fluidized bed reactor wherein a fluidizing agent in the form of an upwardly flowing liquid or gas contacts with or separates from the fluidized media in the form of suspended solid particles, droplets of liquid, or gas bubbles comprising:

a plurality of bidirectionally alternately inclined baffles located in one or more levels, said baffles in each level being positioned at the same elevation, and forming in said level a grid consisting of cells with expanding and contracting plan area in the direction of the flow of the fluidizing agent, said cells with expanding and contracting plan area being checkered, said baffles being alternately inclined in the cross section of the packing and alternately inclined along any line of baffles bordering said checkered cells thereby producing bidirectional opposite inclination of said baffles;

means for connecting said baffles into said grid; and means for spacing and fastening said grid in the reactor.

2. A packing for a fluidized bed reactor wherein a fluidizing agent in the form of an upwardly flowing liquid or gas contacts with or separates from the fluidized media in the form of suspended solid particles, droplets of liquid, or gas bubbles comprising:

a plurality of alternately inclined baffles located in one or more levels, said baffles in each level being positioned at the same elevation, and forming in said level a grid consisting of cells with expanding and contracting plan area in the direction of the flow of the fluidizing agent, said cells with expanding and contracting plan area being checkered;

means for connecting said baffles into said grid; and means for spacing and fastening said grid in the reactor, wherein said inclined baffles are flat hexagonal elements, said elements being arranged into an array of truncated square or rectangular pyramids with corners cut at their mid-height along vertical planes perpendicular to bisectors at the corners of said pyramids, said pyramids being connected to each other along said corner cuts and forming a rigid grid consisting of said checkered expanding and contracting cells, each of said cells being completely separated from each other by said hexagonal elements, said truncated pyramids with cut corners forming a saddle surface with a nodal point at the intersection of four of said hexagonal elements, said hexagonal elements also being the means for connecting the baffles into said grid so that the need in said means for connecting said baffles in said grid is eliminated.

3. A packing for a fluidized bed reactor as recited in claim 2 wherein holes are provided at all selected nodal points for receiving the means for spacing and fastening said grids in the reactor.

* * * * *